United States Patent
Venier et al.

[11] 3,715,274
[45] Feb. 6, 1973

[54] NUCLEAR FUEL ASSEMBLY WITH REINFORCED FLOW CHANNEL

[75] Inventors: Dominic A. Venier; Bart A. Smith; James L. Lass, all of San Jose, Calif.

[73] Assignee: General Electric Company

[22] Filed: Aug. 15, 1969

[21] Appl. No.: 850,486

[52] U.S. Cl. .................................. 176/78, 176/76
[51] Int. Cl. ........................................... G21c 3/34
[58] Field of Search ................... 176/76, 78, 87, 73

[56] References Cited

UNITED STATES PATENTS

| | | | |
|---|---|---|---|
| 3,104,218 | 9/1963 | Speidel et al. | 176/78 |
| 3,137,635 | 6/1964 | Moore et al. | 176/78 X |
| 3,158,549 | 11/1964 | Fowler | 176/78 |
| 3,309,280 | 3/1967 | Balog | 176/61 |
| 3,317,399 | 5/1967 | Winders | 176/78 |
| 3,350,275 | 10/1967 | Venier et al. | 176/76 X |
| 3,368,946 | 2/1968 | Jenssen | 176/78 |
| 3,395,077 | 7/1968 | Long Sun Tong et al. | 176/78 |
| 3,481,021 | 12/1969 | Glandin et al. | 176/78 X |
| 3,344,036 | 9/1967 | Haslam et al. | 176/76 X |

*Primary Examiner*—Carl D. Quarforth
*Assistant Examiner*—Gary G. Solyst
*Attorney*—Ivor J. James, Jr., Samuel E. Turner, Frank L. Neuhauser, Oscar B. Waddell and Joseph B. Forman

[57] ABSTRACT

A nuclear fuel assembly wherein the lower portion of the flow channel is reinforced or stiffened in the region of its interface with the lower tie plate for improved control of bypass flow of coolant into the spaces between the fuel assemblies of a nuclear reactor.

9 Claims, 10 Drawing Figures

PATENTED FEB 6 1973

3,715,274

INVENTORS:
DOMINIC A. VENIER
BART A. SMITH
JAMES L. LASS

BY: *Samuel E Turner*

ATTORNEY

NUCLEAR FUEL ASSEMBLY WITH REINFORCED FLOW CHANNEL

BACKGROUND

In a known type of nuclear reactor, for example as used in the Dresden Nuclear Power Station near Chicago, Illinois the reactor core is of the heterogeneous type. That is, the core comprises a plurality of fuel assemblies vertically arranged in an array to form the nuclear reactor core capable of self-sustained nuclear fission reaction. The core is contained in a pressure vessel wherein it is submersed in a working fluid, such as light water, which serves both as a coolant and as a neutron moderator. A plurality of control rods, containing neutron absorbing material, are selectively insertable among the fuel assemblies to control the reactivity of the core.

Each fuel assembly comprises a tubular flow channel containing an array of elongated, cladded fuel elements or rods supported between upper and lower tie plates. The fuel assemblies are supported in the pressure vessel between an upper core grid and a lower core support plate. The lower tie plate of each fuel assembly is formed with a nose piece which seats in a fuel support casting which in turn fits through an aperture in the core support plate into a pressurized coolant supply chamber. The nose piece is formed with openings through which the pressurized coolant flows upward through the fuel assembly flow channels to remove heat from the fuel elements. A typical fuel assembly of this type is shown, for example, by D. A. Venier et al. in U.S. Pat. No. 3,350,275. In nuclear reactors of recent design in-core nuclear instrumentation, in the form of neutron detectors, are contained in instrumentation receptacles located in the gaps between the fuel assemblies.

In a water reactor heat is transferred from the fuel through the fuel rod cladding to the water flowing upward among the fuel rods. At some elevation the flowing water reaches saturation temperature and beyond this point increasing fractions of the water are in the vapor phase. Normally, the heat transfer coefficient between the fuel rod cladding and the water is substantially constant. However, if the heat-flux is increased sufficiently, a threshold is reached at which the heat transfer coefficient decreases suddenly by a factor of 5 to 10. This is caused by a change in the heat transfer mechanism from nucleate boiling to film boiling and it results in a very rapid, undesirable rise in fuel rod cladding temperature. The heat flux at the threshold between nucleate boiling and film boiling is designated the "critical heat flux."

An important consideration in the design of boiling water reactors is the relationship between the in-channel flow or the coolant flow through the fuel assembly flow channels and the bypass flow or the coolant flow through the gaps among the fuel assemblies. On the one hand it is desirable to maximize the in-channel flow to thereby maximize the margin to critical heat flux. On the other hand it is necessary to provide a limited amount of bypass flow to avoid coolant stagnation and steam voids and adequately to cool the control rods and the in-core instrumentation devices located in the gaps between the fuel assembly flow channels. Thus for a given total core recirculation flow, the desirable balance between in-channel and bypass flow maintains an adequate margin to critical heat flux while avoiding excessive out-of-channel voids.

In prior arrangements control of bypass flow is accomplished by allowing an amount of coolant leakage between the assembly flow channel and the lower tie plate. The flow channel is not fixed to the fuel assembly but is instead a slip fit over the upper and lower tie plate so that it readily can be removed during refueling and for inspection of the fuel assemblies and rods. The flow channel is formed of relatively thin material to minimize space and to minimize parasitic neutron absorption and it is found that increases in pressure of the coolant (to increase coolant flow through the fuel assemblies) causes the flow channel to deflect away from the lower tie plate thus causing an excessive amount of bypass flow with the danger of depriving the fuel assembly of its required coolant flow.

The prior arrangements for bypass flow have been found inadequate for nuclear reactors of recent design which operate at higher power density, higher steam qualities and lower thermal margins. Thus it is found desirable to provide more stringent and accurate control of the bypass flow.

SUMMARY

It is an object of the invention to provide an improved fuel assembly incorporating a bypass flow control arrangement which maintains the bypass flow at a substantially constant percentage of the total core flow and which does not unduly compromise the ease of removing and placing the flow channel.

These and other objects are accomplished according to the present invention by providing reinforcing or stiffening of the lower end of the flow channel in the region of the interface between the flow channel and the lower tie plate to enhance control of leakage flow between the channel and the lower tie plate.

In accordance with a first illustrated embodiment the lower portion of the flow channel is formed with circumferential corrugations to increase its stiffness.

In accordance wit a second illustrated embodiment the lower portion of the flow channel is formed with a greater thickness for increased strength and stiffness.

In accordance with a third illustrated embodiment the lower portion of the flow channel is reinforced by a sleeve surrounding and attached to the lower portion of the flow channel. The reinforcing sleeve may be plain or corrugated. In an alternate version of the third embodiment reinforcement is provided by a series of spaced narrow sleeves or rings.

In accordance with a fourth illustrated embodiment the lower portion of the flow channel is reinforced by hemming, that is, by forming the channel extra long and by folding the extra length of the channel walls back along the lower portion of the channel.

BRIEF DESCRIPTION OF THE DRAWING

The invention is described more specifically hereinafter with reference to the accompanying drawing wherein.

GENERAL DESCRIPTION

Figure 1:
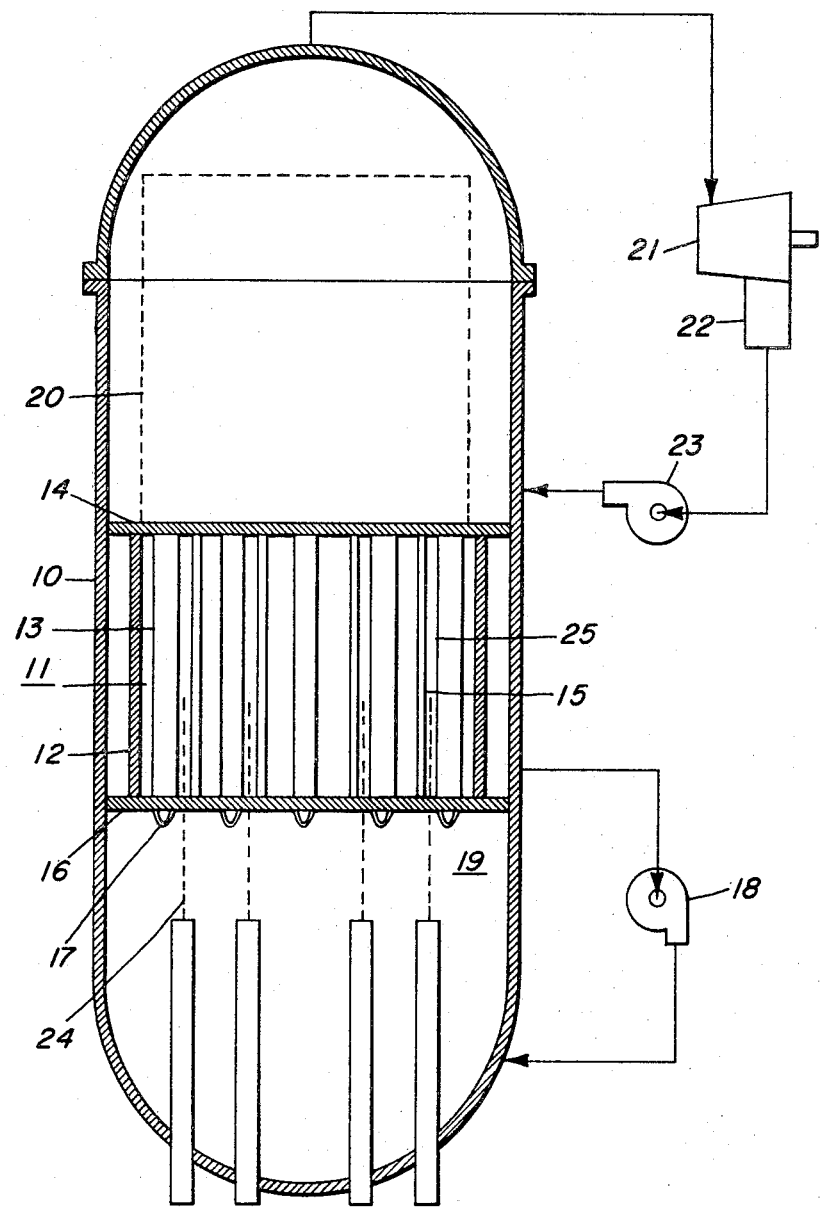
FIG. 1 is a schematic illustration of a nuclear reactor steam generator.

The invention is described herein in connection with a water cooled and moderated nuclear reactor, an example of which is illustrated in FIG. 1. Such a reactor system includes a pressure vessel 10 containing a nuclear chain reactor core 11 submersed in a coolant such as light water. The core 11 is surrounded by an annular shroud 12. The core 11 includes a plurality of replaceable fuel assemblies 13 arranged in spaced relation and supported in the vessel 10 between an upper core grid 14 and a lower core support plate 16. Each fuel assembly includes a nose piece 17 which engages a support socket in the support plate 16. The end of the nose piece projects through the support plate 16 and is formed with openings for communication with a coolant supply chamber 19. A circulation pump 18 pressurizes the coolant in the supply chamber 19 from which the coolant is forced through the openings in the nose pieces 17 upward through the fuel assemblies. A part of the coolant is thereby converted to steam which passes through a separator-dryer arrangement 20 to a utilization device such as a turbine 21. Condensate formed in a condenser 22 is returned as feedwater to the vessel 10 by a pump 23. A plurality of control rods 24 are selectively insertable among the fuel assemblies 13 for control of the reactivity of the core. A plurality of instrumentation receptacles 15 are positioned among the fuel assemblies to contain neutron detectors for monitoring the power level of the core.

Figure 2:
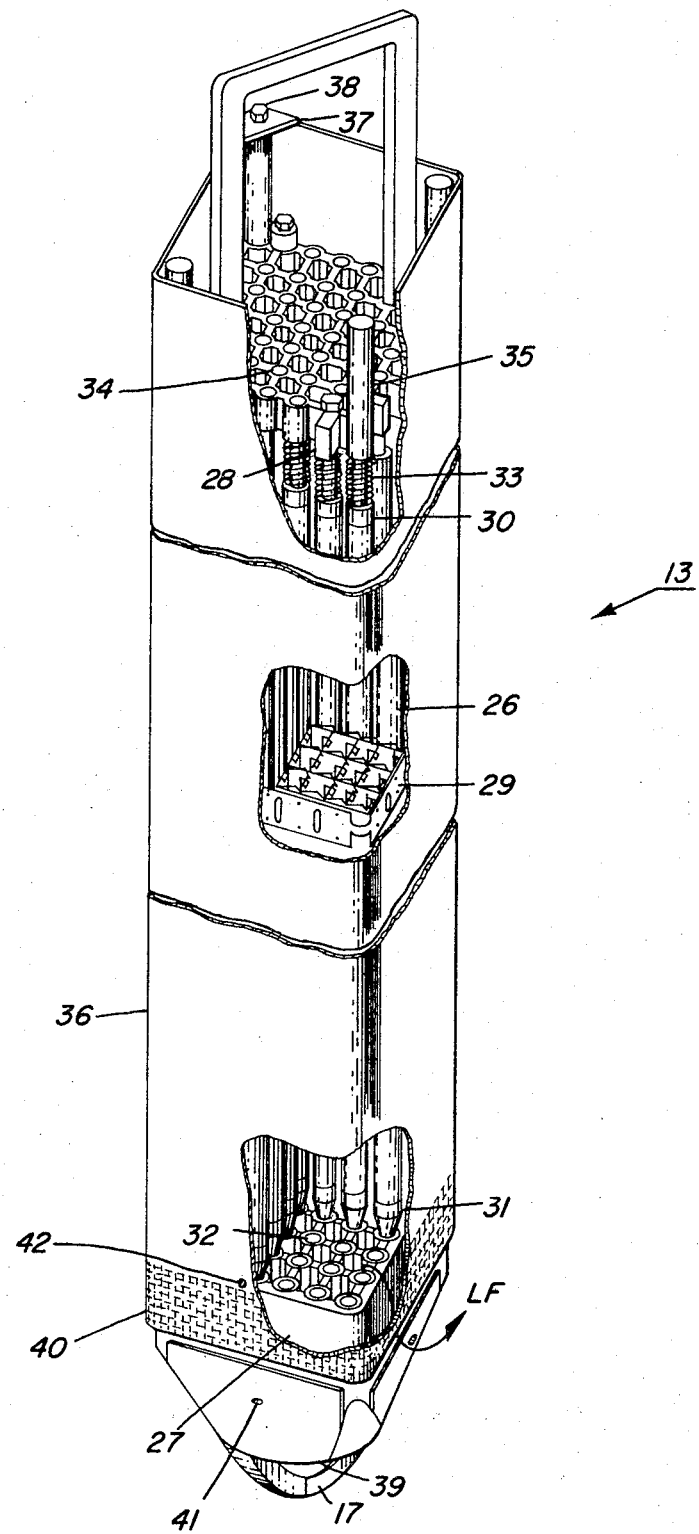
FIG. 2 is a partly cutaway perspective view of a fuel assembly.

Illustrated in FIG. 2 is a fuel assembly 13 comprising a plurality of elongated fuel rods 26 supported between a lower tie plate 27 and a skeletonized upper tie plate 28. The fuel rods 26 pass through a plurality of fuel rod spacers 29 which provide intermediate support to retain the elongated rods in spaced relation and restrain them from lateral vibration.

Each of the fuel rods 26 comprises an elongated tube containing the fissionable fuel, in the form of pellets, particles, powder or the like, sealed in the tube by upper and lower end plugs 30 and 31. Lower end plugs 31 are formed with a taper for registration and support in support cavities 32 which are formed in the lower tie plate 27. Upper end plugs 30 are formed with extensions 33 which register with support cavities 34 in the upper tie plate 28.

Several of the support cavities 32 (for example, selected ones of the edge or peripheral cavities) in the lower tie plate 27 are formed with threads to receive fuel rods having threaded lower end plugs 31. The extensions 33 of the upper end plugs 30 of these same fuel rods are elongated to pass through the cavities in upper tie plate 28 and are formed with threads to receive internally threaded retaining nuts 35. In this manner the upper and lower tie plates and the fuel rods are formed into a unitary structure.

The fuel assembly 13 further includes a thin-walled tubular flow channel 36, of substantially square cross section, adapted to provide a sliding fit over the lower and upper tie plates 27 and 28 and the spacers 29 so that it readily may be mounted and removed. The channel 36 has a tab 37 welded to the top end which provides for fastening the channel to the fuel bundle with a bolt 38.

The lower tie plate 27 is formed with a nose piece 17 adapted, as mentioned hereinbefore, to support the fuel assembly in a socket in the support plate 16 (FIG. 1). The end of the nose piece is formed with openings 39 to receive the pressurized coolant so that it flows upward among the fuel rods.

To avoid stagnation of the coolant in the spaces 25 (FIG. 1) among the fuel assemblies, a portion (in the order of 5-6 percent) of the coolant flow into each fuel assembly is allowed to leak into the adjacent spaces 25 from between the lower tie plate 27 and the channel 36 of the fuel assembly as indicated by the arrow legended LF in FIG. 2 to provide bypass flow among the channels. As discussed hereinbefore, the prior arrangements have not provided adequate regulation of this bypass flow. In accordance with the present invention control of the leakage flow LF is enhanced by strengthening or stiffening the lower portion 40 of the flow channel 36 in the region of the interface between the flow channel and the lower tie plate 27. The thus reinforced flow channel more successfully resists deflection away from the lower tie plate with increased pressure differentials and irradiation life whereby the leakage flow area and consequently the percentage leakage flow remains more nearly constant.

If the reinforced or stiffened flow channel is found too restrictive of bypass flow, additional bypass flow passages, 41 through the lower tie plate 27 and/or 42 through the walls of flow channel 36, may be provided.

FIRST EMBODIMENT

Figure 3:
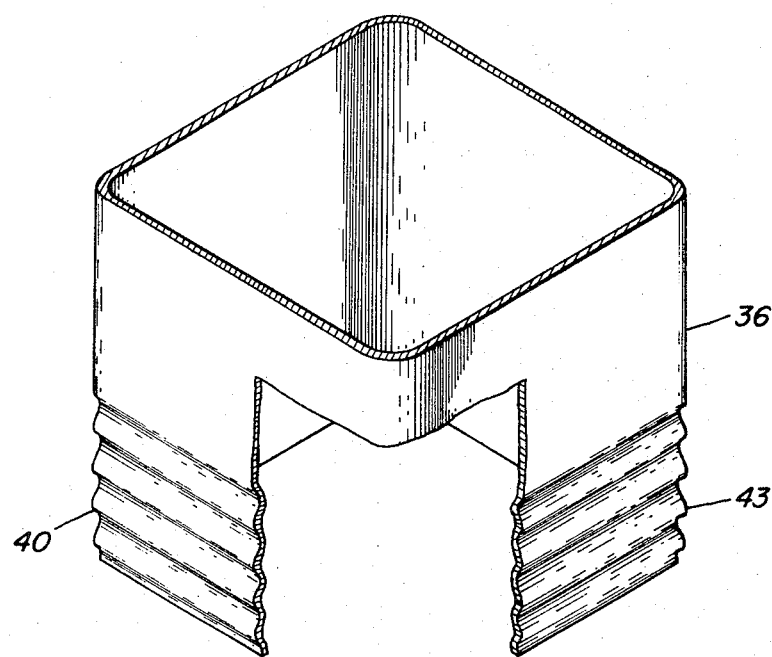
FIG. 3 is a partly cutaway perspective view of the flow channel illustrating the corrugated reinforced lower portion of the flow channel of the first embodiment.

A first embodiment of the invention is illustrated in FIG. 3. In this embodiment the lower, interface portion 40 of the flow channel 36 is reinforced and stiffened by forming this portion with circumferential corrugations 43. The corrugations provide greatly increased lateral stiffness to deflection of this portion away from the lower tie plate 27. Additionally, the convolutions of the corrugations, being perpendicular to the leakage flow, provide increased flow resistance in the leakage flow path.

SECOND EMBODIMENT

Figure 4A:
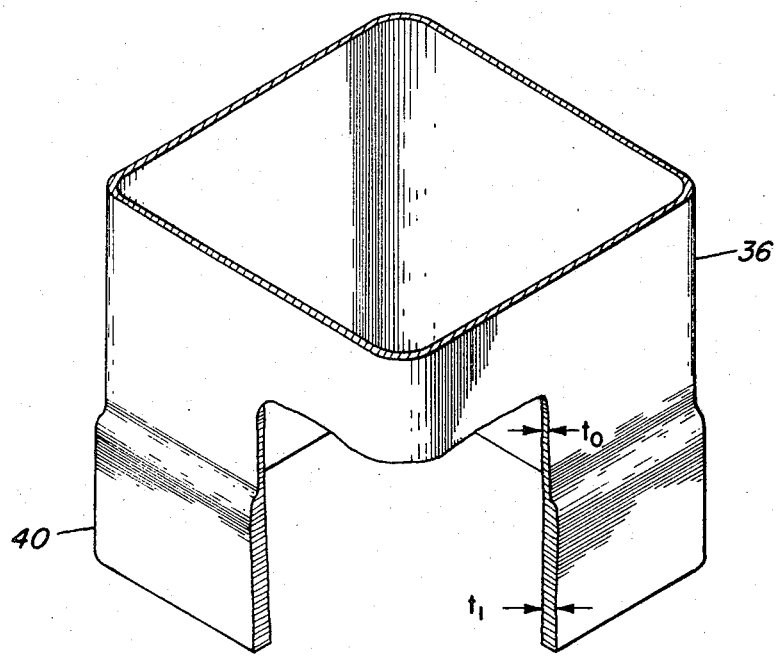
FIG. 4a is a partly cutaway perspective view of the flow channel illustrating the thickened lower portion of the second embodiment.
Figure 4B:
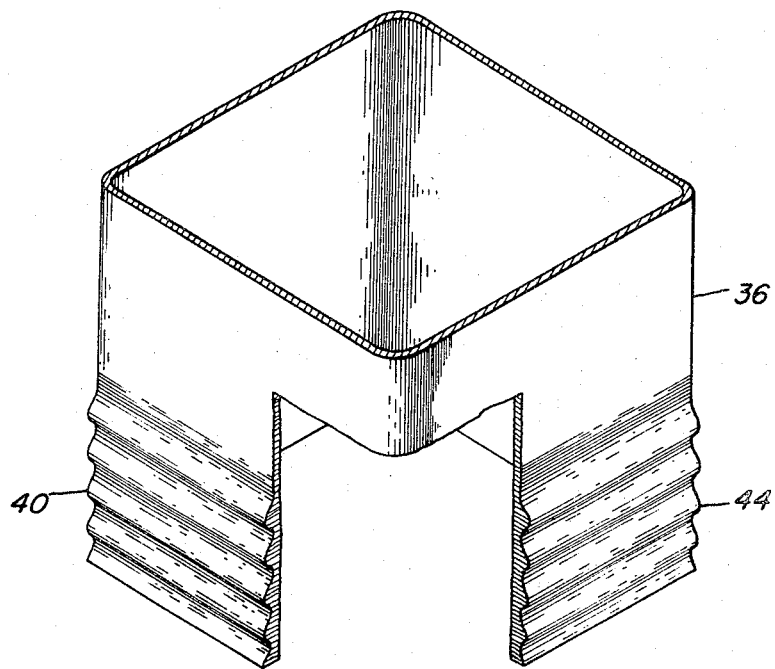
FIG 4b is a partly cutaway perspective view of the flow channel illustrating a grooved or corrugated version of the thickened, reinforced portion of the flow channel.

A second embodiment of the invention is illustrated in FIGS. 4a and 4b. In this embodiment the lower portion 40 only of the flow channel 36 is formed with a greater thickness $t_1$ sufficient to provide the desired strength and stiffness in this interface portion while the remainder of the flow channel is formed of its normal thickness $t_o$. As illustrated in FIG. 4b, the outer surface of the thicker portion may be formed with circumferential grooves or corrugations 44 for increased stiffness-to-quantity of material ratio.

THIRD EMBODIMENT

Figure 5A:
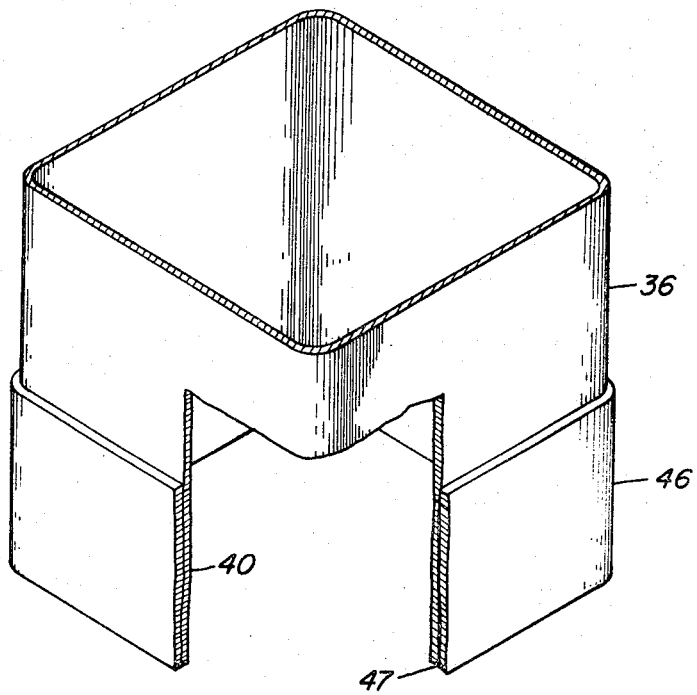
FIG. 5a is a partly cutaway perspective view of the flow channel illustrating the reinforcing sleeve around the lower portion of the channel in accordance with the third embodiment.
Figure 5B:
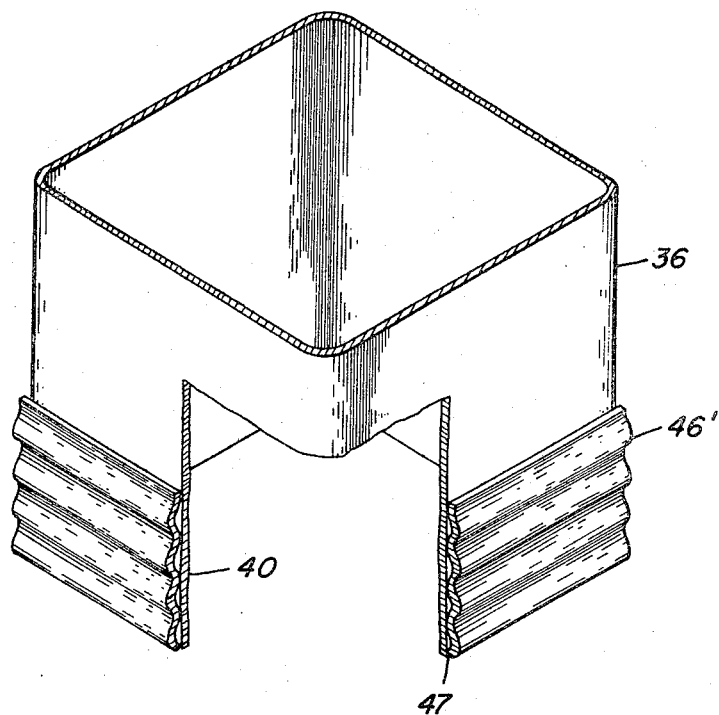
FIG. 5b is a partly cutaway perspective view of the flow channel illustrating a corrugated version of the reinforcing sleeve.
Figure 5C:
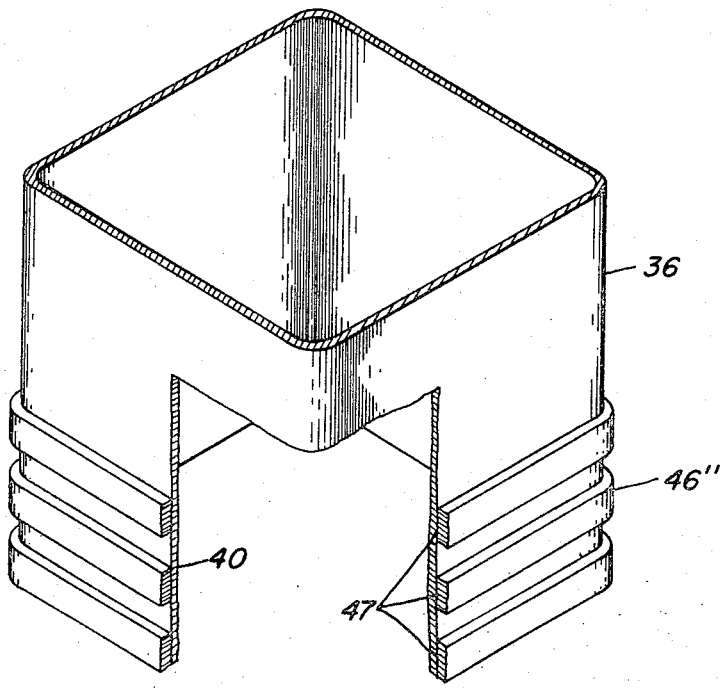
FIG. 5c is a partly cutaway perspective view of the flow channel illustrating a series of spaced, narrow reinforcing sleeves or rings.

A third embodiment of the invention is illustrated in FIGS. 5a, 5b and 5c. In this embodiment the lower, interface portion 40 of the flow channel 36 is reinforced and stiffened by a surrounding sleeve. As illustrated in FIG. 5a, a sleeve 46 surrounds the lower portion 40 of the flow channel 36 and is attached thereto as by welding at 47. The sleeve 46 may be stress relieved in well-known manner before attachment to channel 36 to decrease creep and relaxation with irradiation and aging.

The reinforcing sleeve may be corrugated for increased stiffness-to-quantity of material ratio as illustrated by a corrugated sleeve 46' in FIG. 5b.

A greater strength-to-quantity of material ratio may also be achieved as illustrated in FIG. 5c wherein the interface portion 40 of the flow channel 36 is reinforced by a series of spaced narrow sleeves or rings 46''.

FOURTH EMBODIMENT

Figure 6:
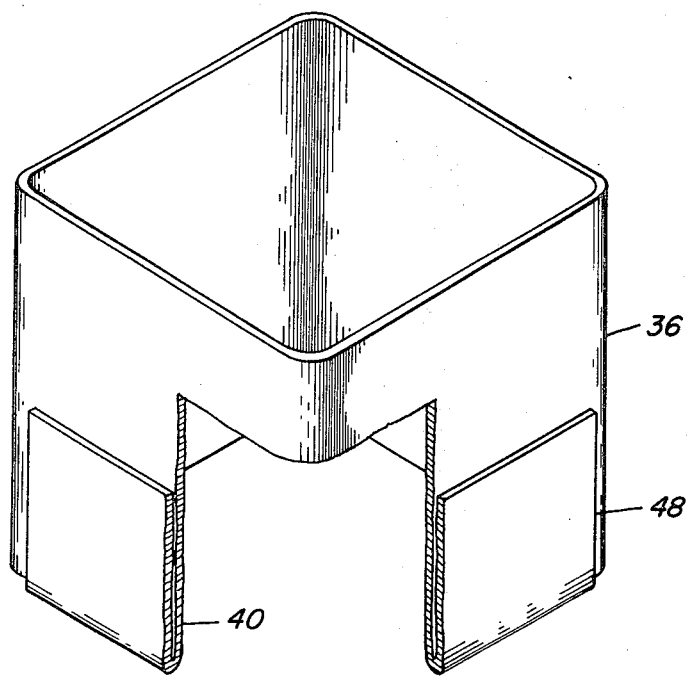
FIG. 6 is a partly cutaway perspective view of the flow channel illustrating the hemmed lower portion of the flow channel in accordance with the fourth embodiment.

A fourth embodiment of the invention is shown in FIG. 6. In this embodiment the interface portion 40 of the flow channel 36 is reinforced and stiffened by hemming. This may be accomplished by originally forming the flow channel 36 extra long. The corners of the extra length portion are cut away leaving a reinforcing tab 48 extending from each side of the flow channel. Each of the reinforcing tabs 48 is then folded outwardly and back against the outer walls of the interface portion 40 of the flow channel.

While with some materials it is possible to extend the hem around the corners of the flow channel, this is usually impractical due to the difficulty of forming the preferred low neutron absorbing zirconium material. Furthermore, it is found that the desired leakage flow control can be achieved without extension of the hem around the corners.

Figure 7:
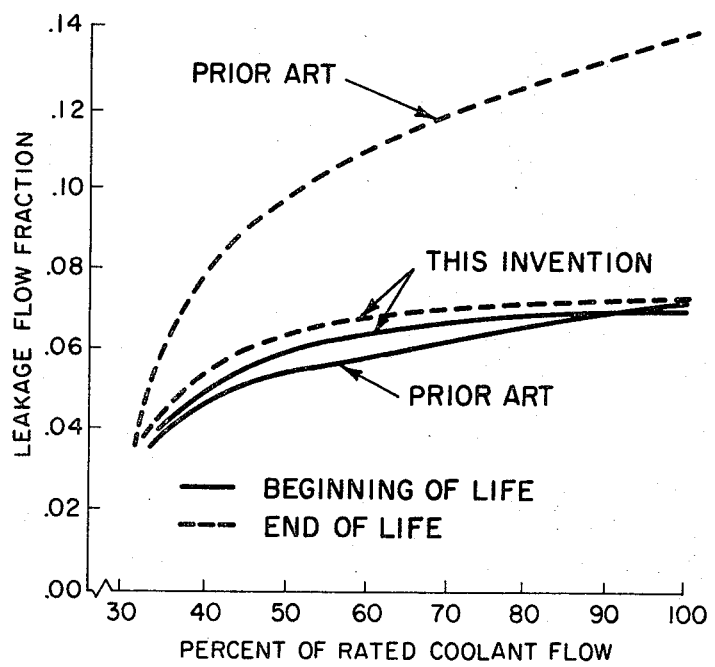
FIG. 7 is a graphical illustration of the performance of the present invention compared to the prior art arrangement.

The effectiveness of the present invention is graphically illustrated in FIG. 7 which compares the performance of the flow control arrangement of the invention with the prior art arrangement which relied only upon a predetermined fit between the flow channel 36 and the lower tie plate 27. The solid curves show the performance of new fuel assemblies while the dashed curves show end-of-life performance, that is, after the assembly has been operated in a reactor core on the order of several years. For the prior art arrangement the leakage flow increases by more than one-third with life while for the arrangement of the present invention the leakage flow change with life is less than one percent. Changes in leakage flow with changes in coolant flow are significantly less for the arrangement of the present invention. A further outstanding advantage of the invention is that it does not compromise or complicate the ready removal and replacement of the flow channel 36.

While illustrative embodiments of the invention have been described herein, modifications and adaptations thereof may be made by those skilled in the art without departure from the spirit and scope of the invention as defined by the following claims.

What is claimed is:

1. A fuel assembly comprising a plurality of fuel rods positioned in a spaced array by upper and lower tie plates, said lower tie plate having means to receive therethrough a flow of coolant, an open-ended tubular flow channel surrounding said array for conducting said coolant upward past said fuel rods, a portion of the lower end of said channel closely surrounding a peripheral surface of said lower tie plate to limit leakage of said coolant therebetween, said channel being attached to said assembly solely at the top of said assembly with readily releasable attachment means and said channel being freed from and detached from said lower tie plate so that said channel readily is removable from said assembly, means separate from said channel connecting said upper and lower tie plates together and maintaining said fuel rods in said spaced array independent of said flow channel, said flow channel being formed with a reinforced portion in the region of interface with said lower tie plate for added resistance to deflection of said portion of said flow channel away from said lower tie plate.

2. The fuel assembly of claim 1 wherein said lower tie plate is formed with at least one bypass coolant flow passage directly from the interior of said lower tie plate to the exterior of said fuel assembly.

3. The fuel assembly of claim 1 wherein said reinforced portion of said flow channel is formed with circumferential corrugations.

4. The fuel assembly of claim 1 wherein the walls of said reinforced portion of said flow channel are formed of thicker material than the remainder of the walls of said flow channel.

5. The fuel assembly of claim 4 wherein the outer surface of the thicker wall portion of said flow channel is circumferentially grooved.

6. The fuel assembly of claim 1 wherein said reinforced portion of said flow channel is surrounded by a reinforcing sleeve.

7. The fuel assembly of claim 6 wherein said sleeve is circumferentially corrugated.

8. The fuel assembly of claim 1 wherein said reinforced portion of said flow channel is surrounded by each of a plurality of spaced sleeves extending circumferentially around said portion 9. The fuel assembly of claim 1 wherein the end of said flow channel adjacent said one of said tie plates is hemmed to form said reinforced portion of said flow channel.

* * * * *